(12) United States Patent
Hasegawa et al.

(10) Patent No.: US 10,696,252 B2
(45) Date of Patent: Jun. 30, 2020

(54) VEHICLE BODY STRUCTURE

(71) Applicant: HONDA MOTOR CO., LTD., Minato-ku, Tokyo (JP)

(72) Inventors: Atsushi Hasegawa, Wako (JP); Hiroyoshi Watanabe, Utsunomiya (JP); Keiichiro Okuyama, Shioya (JP); Hirofumi Kikuchi, Haga-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 61 days.

(21) Appl. No.: 15/996,576

(22) Filed: Jun. 4, 2018

(65) Prior Publication Data

US 2019/0016282 A1    Jan. 17, 2019

(30) Foreign Application Priority Data

Jul. 13, 2017   (JP) ................... 2017-137103

(51) Int. Cl.
  *B60R 19/02*   (2006.01)
  *B60R 19/24*   (2006.01)
  *B60R 19/34*   (2006.01)

(52) U.S. Cl.
  CPC ............ *B60R 19/023* (2013.01); *B60R 19/24* (2013.01); *B60R 19/34* (2013.01)

(58) Field of Classification Search
  CPC ........ B60R 19/34; B60R 19/023; B60R 19/24
  See application file for complete search history.

(56) References Cited

U.S. PATENT DOCUMENTS

| | | | |
|---|---|---|---|
| 9,393,923 B2 * | 7/2016 | Handing | B60R 19/34 |
| 2009/0200811 A1 * | 8/2009 | Erzgraber | B60R 19/18 |
| | | | 293/120 |
| 2011/0193370 A1 | 8/2011 | Klimek | |
| 2015/0336526 A1 | 11/2015 | Handing et al. | |

FOREIGN PATENT DOCUMENTS

| | | |
|---|---|---|
| JP | 03-136979 | 6/1991 |
| JP | 2006-027499 | 2/2006 |
| JP | 2007-137326 | 6/2007 |
| JP | 2010-013053 | 1/2010 |
| JP | 2011-189915 | 9/2011 |
| JP | 2013-233898 | 11/2013 |
| JP | 2014-113894 | 6/2014 |

OTHER PUBLICATIONS

Japanese Office Action for Japanese Patent Application No. 2017-137103 dated Jan. 29, 2019.

* cited by examiner

*Primary Examiner* — D Glenn Dayoan
*Assistant Examiner* — Melissa Ann Bonifazi
(74) *Attorney, Agent, or Firm* — Amin, Turocy & Watson, LLP

(57) ABSTRACT

A vehicle body rear part structure includes a bumper beam, an extension, and a gusset. The bumper beam extends in a vehicle width direction in a rear part of a vehicle body. The extension is provided for attaching the bumper beam to the vehicle body. The gusset is provided between the bumper beam and the extension and at an inner position in a vehicle width direction of the extension. A deformation facilitating part is provided on a middle part of the gusset.

6 Claims, 8 Drawing Sheets

VEHICLE BODY STRUCTURE

CROSS-REFERENCE TO RELATED APPLICATION

Priority is claimed on Japanese Patent Application No. 2017-137103, filed on Jul. 13, 2017, the contents of which are incorporated herein by reference.

BACKGROUND

Field of the Invention

The present invention relates to a vehicle body structure.

Background

As a vehicle body structure, a structure is known in which an extension is provided on a rear end part of a rear side frame, a bumper beam is provided on the extension, and a gusset is connected to the extension and the bumper beam. In this vehicle body structure, when an impact load is input due to rear collision from a vehicle body rearward direction to the bumper beam, the input impact load is transmitted from the bumper beam via the gusset to the extension. Accordingly, it is possible to support the input impact load by the extension (for example, refer to Japanese Patent Application, Publication No. 2013-233898A).

SUMMARY

The impact load that is input to the bumper beam is transmitted via the gusset to the extension. Therefore, it is imaginable that the load which is transmitted from the gusset to the extension is too large, and from this point of view, there remains room for improvement.

An aspect of the present invention provides a vehicle body structure capable of reducing an impact load that is input from a gusset to an extension.

(1) An aspect of the present invention is a vehicle body structure including: a bumper beam that extends in a vehicle width direction in at least one of front and rear parts of a vehicle body; an extension for attaching the bumper beam to the vehicle body; and a gusset that is provided between the bumper beam and the extension and at an inner position in a vehicle width direction of the extension, wherein a deformation facilitating part is provided on a middle part of the gusset.

In this way, the gusset that is provided between the bumper beam and the extension, and the deformation facilitating part is provided on the gusset. For example, when an impact load is input to the bumper beam due to collision, the input impact load is transmitted from the bumper beam to the gusset. It is possible to deform the gusset from the deformation facilitating part by the impact load that is input to the gusset. Accordingly, the impact load is absorbed by the gusset, and it is possible to reduce the impact load that is input to the extension from the gusset.

The middle part of the gusset is provided at a position that is relatively separated from the bumper beam and the extension. Therefore, the deformation facilitating part is provided on the middle part of the gusset. Accordingly, it is possible to ensure the deformation amount of the deformation facilitating part. Thereby, it is possible to favorably deform the gusset by the impact load that is transmitted to the gusset.

(2) In the vehicle body structure described above, the gusset may have an outer wall on an outer side in a vehicle width direction and an inner wall on an inner side in the vehicle width direction that extend in a vehicle body front-to-rear direction, and the deformation facilitating part may have a bend part that is provided on the outer wall and that is bent toward the extension (outward in the vehicle width direction).

In this way, the bend part is provided as the deformation facilitating part on the outer wall of the gusset, and the bend part is bent toward the extension (outward in the vehicle width direction). Accordingly, it is possible to deform the gusset by the bend part to the extension side. Thereby, it is possible to allow the joint part between the extension and the gusset not to be easily peeled.

Further, when the deformation amount of the gusset is large, it is possible to allow the gusset to come into contact with the extension. Thereby, when a relatively large impact load is input to the gusset, in a state where the gusset is deformed to the extension side, it is possible to efficiently transmit the impact load to the extension.

(3) In the vehicle body structure described above, the gusset may have a first rib that is connected to the outer wall and the inner wall and that extends in a vehicle body front-to-rear direction and a second rib that extends toward the extension diagonally outward in a vehicle width direction from a connection point between the first rib and the inner wall.

The impact load that is input to the bumper beam is transmitted in the vehicle body front-to-rear direction to the gusset. Therefore, the first rib is connected to the outer wall and the inner wall, and the first rib is extended in the vehicle body front-to-rear direction. Accordingly, it is possible to efficiently transmit the impact load that is input to the bumper beam to the first rib (that is, the gusset).

Further, the second rib is extended outward in the vehicle width direction toward the extension from the connection point between the first rib and the inner wall. Accordingly, it is possible to efficiently transmit the load that is transmitted to the first rib to the extension.

Thereby, it is possible to facilitate the deformation of the gusset at a desired position by the first rib and the second rib.

(4) In the vehicle body structure described above, the gusset may have a third rib that extends diagonally inward in a vehicle width direction to the inner wall from a connection point between the first rib and the outer wall and a fourth rib that extends diagonally inward in a vehicle width direction to the inner wall from a connection point between the second rib and the outer wall.

In this way, the third rib is extended to the inner wall from the connection point between the first rib and the outer wall. Further, the fourth rib is extended to the inner wall from the connection point between the second rib and the outer wall. The third rib is arranged on the bumper beam side. Accordingly, it is possible split the cross-section of the gusset small by the third rib in the vicinity of a connection point between the bumper beam and the gusset.

Further, the fourth rib is arranged on the extension side. Accordingly, it is possible split the cross-section of the gusset small by the fourth rib in the vicinity of a connection point between the extension and the gusset.

Thereby, by splitting the cross-section of the gusset small, it is possible to improve the strength of the gusset.

(5) The vehicle body structure described above may include a sub beam that is provided on an outer surface of the bumper beam and that extends in a vehicle width direction, wherein the sub beam may have a first splitting wall that extends diagonally toward a vehicle body front-to-rear direction at an inner part of the sub beam.

When an impact load is input to the bumper beam, the bumper beam collapses and absorbs the impact load. Therefore, when the sub beam is provided on an outer surface (a front surface or a rear surface) of the bumper beam, the sub beam does not easily collapse.

Therefore, the first splitting wall at the inner part of the sub beam extends diagonally. Accordingly, it is possible to favorably deform the first splitting wall by the impact load that is input to the sub beam. Thereby, it is possible to allow the sub beam to favorably collapse by the impact load that is input to the sub beam. That is, for example, when an impact load is small, it is possible to absorb the impact load by the sub beam.

(6) In the vehicle body structure described above, the sub beam may have a second splitting wall having a shape that is bent in a vertical direction below the first splitting wall.

In this way, the second splitting wall has a shape that is bent in the vertical direction. Accordingly, it is possible to favorably deform the second splitting wall by the impact load that is input to the sub beam. Thereby, it is possible to allow the sub beam to favorably collapse by the impact load that is input to the sub beam. That is, for example, when an impact load is small, it is possible to absorb the impact load by the sub beam.

(7) In the vehicle body structure described above, the bumper beam may be provided on a rear part of the vehicle body, and a stiffener that is fixed to both a rear pillar and a rear fender may be provided along a trunk opening part at a more vehicle body frontward position than the bumper beam.

In this way, the trunk opening part is provided at a more vehicle body frontward position than the bumper beam that is provided on the rear part of the vehicle body, and the stiffener is provided along the trunk opening part. The stiffener is fixed to both the rear pillar and the rear fender.

Thereby, it is possible to reinforce the rear fender by the stiffener, and therefore, it is possible to prevent the deformation of the rear fender due to rear collision by the stiffener.

According to an aspect of the present invention, the gusset is provided between the bumper beam and the extension, and the deformation facilitating part is provided on the gusset. Accordingly, it is possible to deform the gusset from the deformation facilitating part by the impact load that is input to the gusset. Thereby, it is possible to reduce the impact load that is input from the gusset to the extension.

DESCRIPTION OF THE EMBODIMENTS

Figure 1:
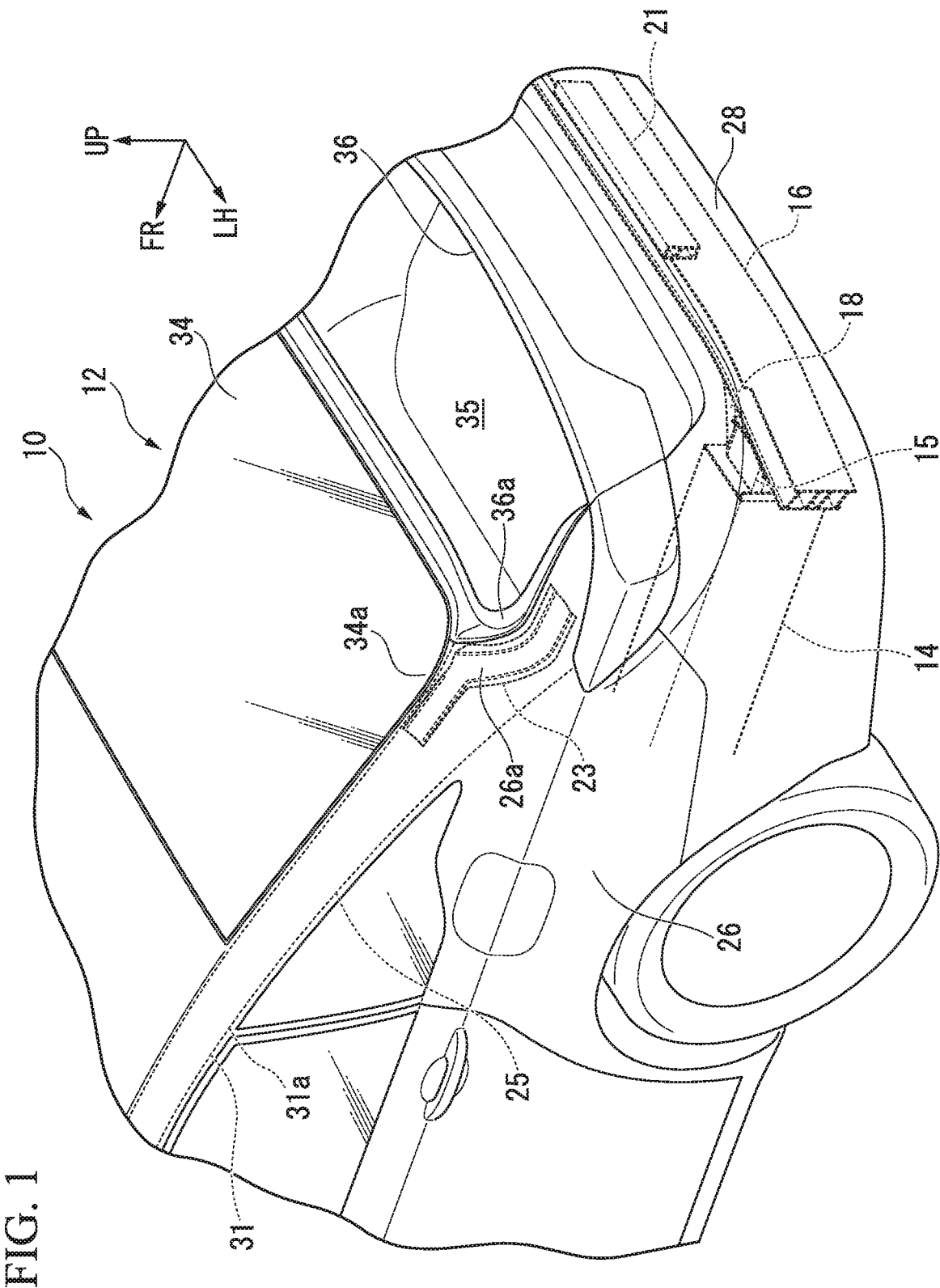
FIG. 1 is a perspective view showing a vehicle body front part structure in an embodiment of the present invention.

An embodiment of the present invention will be described with reference to the drawings. In the drawings, an arrow FR indicates a frontward direction of a vehicle, an arrow UP indicates an upward direction of the vehicle, and an arrow LH indicates a leftward direction of the vehicle.

Hereinafter, in the embodiment, as a vehicle body structure, for example, a vehicle body rear part structure 12 that constitutes a rear part of a vehicle body 10 is shown; however, the embodiment is not limited thereto. As another example, the vehicle body structure can also be, for example, a vehicle body front part structure that constitutes a front part of the vehicle body 10.

Figure 2:
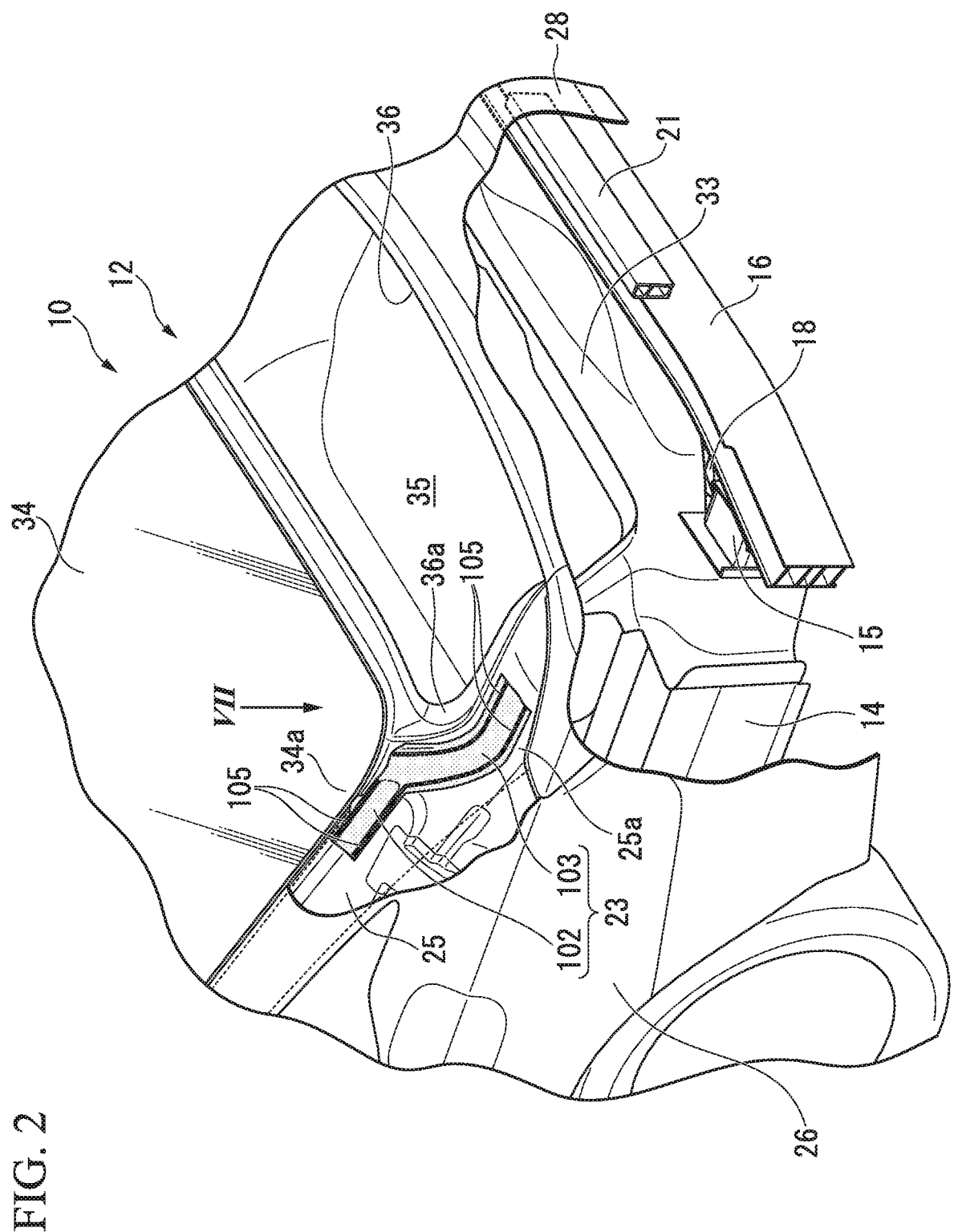
FIG. 2 is a perspective view showing a partially broken state of the vehicle body front part structure of FIG. 1 in the embodiment of the present invention.

As shown in FIG. 1 and FIG. 2, the vehicle body 10 includes the vehicle body rear part structure 12 that constitutes the rear part of the vehicle body 10. The vehicle body rear part structure 12 includes a left rear side frame 14, a right rear side frame 14 (refer to FIG. 3), a left extension 15, a right extension 15 (refer to FIG. 3), a bumper beam 16, a left gusset 18, a right gusset 18 (refer to FIG. 3), a sub beam 21, a left stiffener 23, and a right stiffener 23 (not shown).

The left stiffener 23 and the right stiffener 23 may not be provided.

The vehicle body rear part structure 12 has a substantially symmetric configuration in the right-to-left direction. Accordingly, the same reference signs are given to right configuration members and left configuration members, the left configuration is described in detail, and descriptions of the right configuration are omitted.

In order to facilitate describing the configuration of the vehicle body rear part structure 12, the left rear side frame 14 is described as a "rear side frame 14". The left extension 15 is described as an "extension 15". The left gusset 18 is described as a "gusset 18".

The vehicle body rear part structure 12 includes a rear pillar 25, a rear fender (outer panel) 26, and a rear bumper face 28.

The rear pillar 25 extends to a rear end panel 33 to be a downslope toward a vehicle body rearward direction from a rear end part 31a of a roof rail 31. A rear window glass 34 is supported by the rear pillar 25. A rear part 25a of the rear pillar 25 is provided along a trunk opening part 36 of a trunk room 35. Specifically, the rear part 25a of the rear pillar 25 is provided along a left edge 36a of a circumferential edge of the trunk opening part 36.

The rear fender 26 is an exterior member that covers the rear side frame 14, the stiffener 23, and the rear part 25a of the rear pillar 25 from the left side of the vehicle body 10. The rear bumper face 28 is an exterior member that covers the bumper beam 16, the sub beam 21, and the extension 15 from the rear side of the vehicle body 10.

Figure 3:
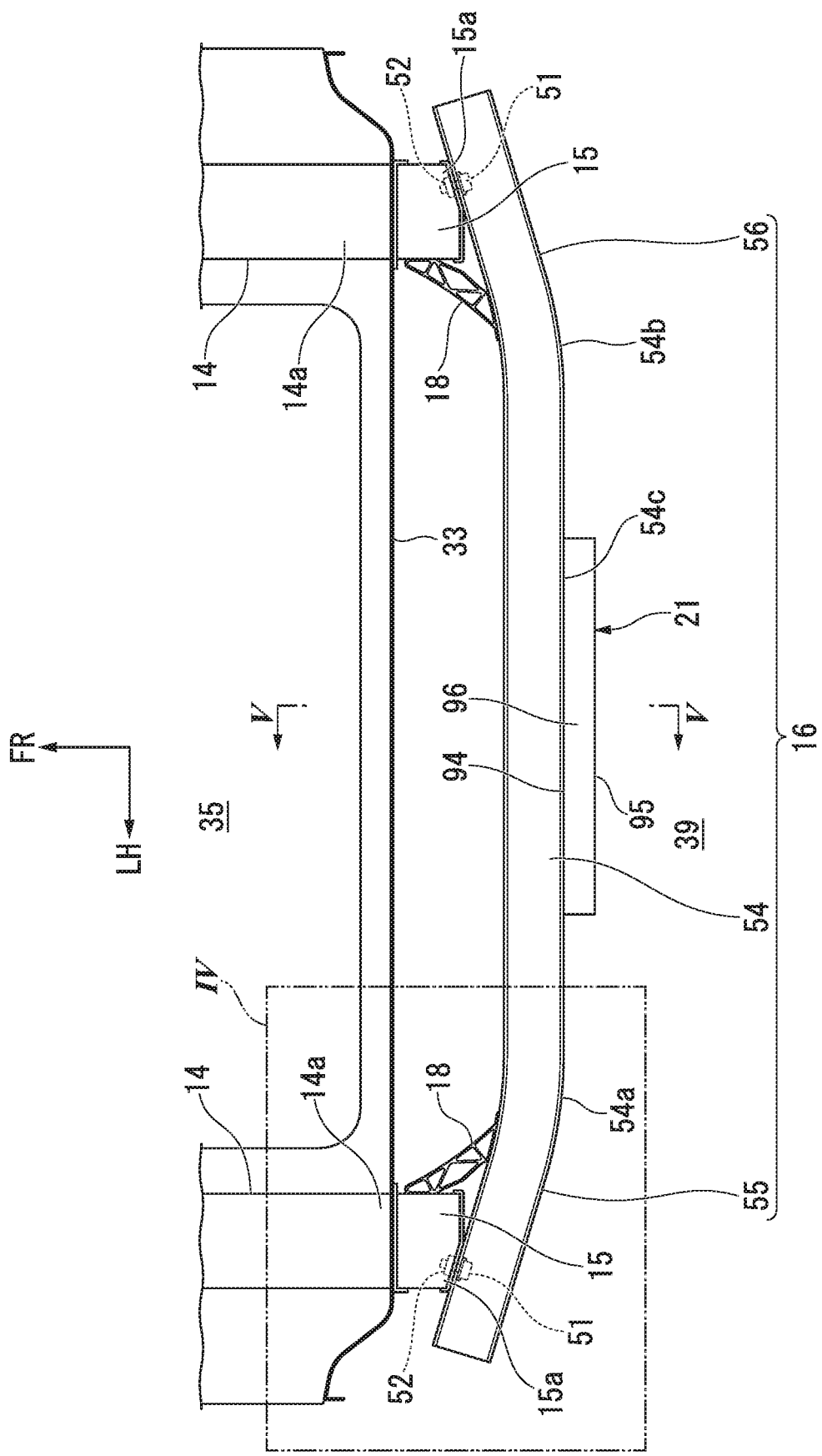
FIG. 3 is a plan view showing a bumper beam, an extension, and a gusset of the vehicle body front part structure in the embodiment of the present invention.

As shown in FIG. 3, the rear end panel 33 is provided on a rear end part 14a of the rear side frame 14 and a rear end part 14a of the right rear side frame 14. The inside of the trunk room 35 and the vehicle outside 39 are split by the rear end panel 33.

The extension 15 is attached via the rear end panel 33 to the rear end part 14a of the rear side frame 14. In other words, the extension 15 protrudes toward the vehicle body rearward direction from the rear end part 14a of the rear side frame 14. Similarly, the right extension 15 protrudes toward the vehicle body rearward direction from the rear end part 14a of the right rear side frame 14.

The bumper beam 16 is connected to a rear end part 15a of the extension 15 and a rear end part 15a of the right extension 15 so as to bridge a space between the rear end parts 15a.

Figure 4:
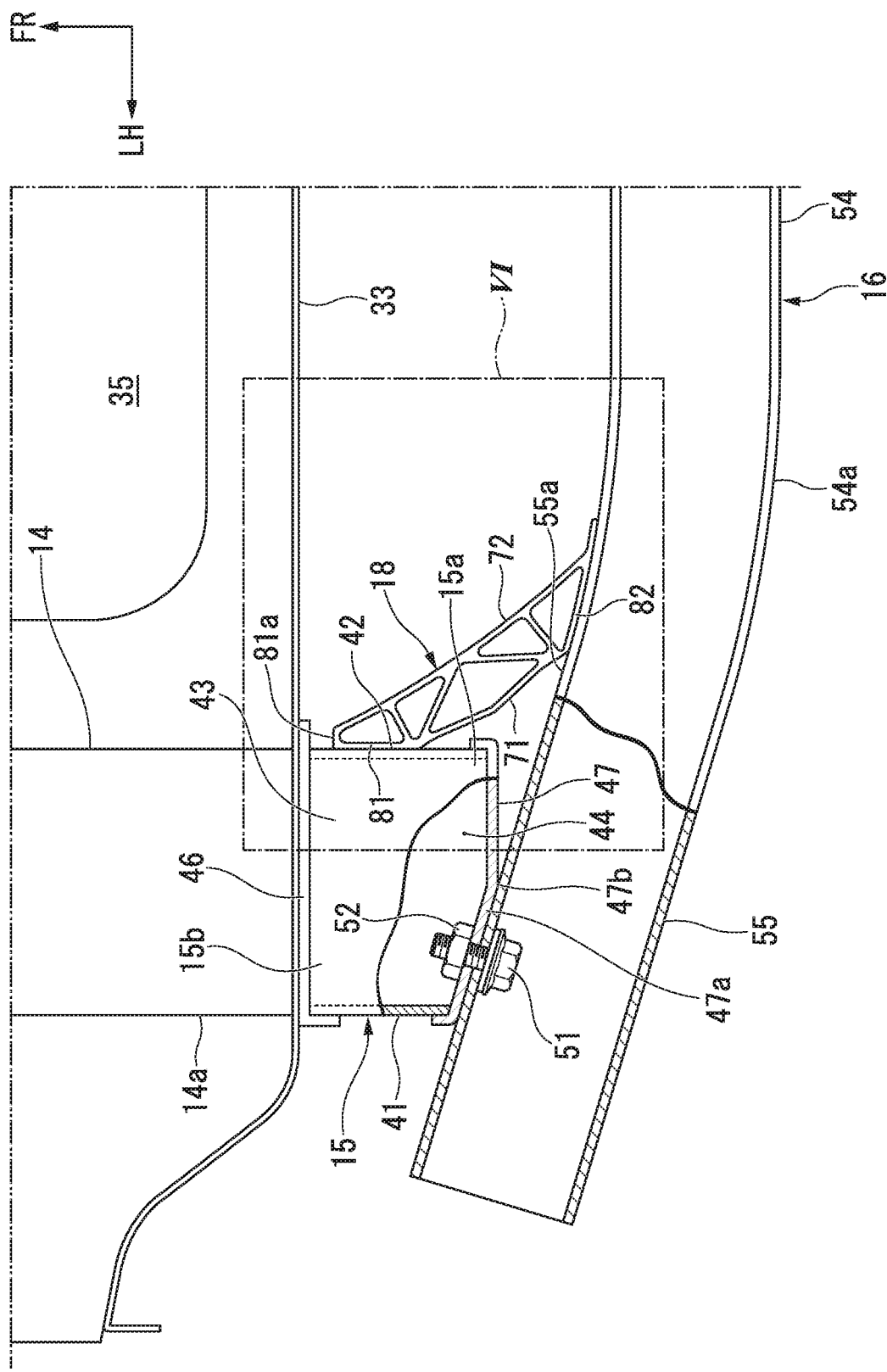
FIG. 4 is a plan view showing an enlarged and partially broken state of a IV part of FIG. 3 in the embodiment of the present invention.

As shown in FIG. 4, the extension 15 is a tubular member, for example, formed by extrusion of an aluminum alloy material. The extension 15 has an outer wall 41, an inner wall 42, an upper part 43, and a lower part 44. The extension 15 is formed of the outer wall 41, the inner wall 42, the upper part 43, and the lower part 44 in a hollow shape that penetrates toward the vehicle body front-to-rear direction and that has a rectangular frame in a cross-section.

The extension 15 may not have a hollow shape, and a partition wall and the like may be provided inside the extension 15.

A front plate 46 is joined to a front end part 15b of the extension 15, for example, by mig welding. A front opening part of the extension 15 is closed by the front plate 46. The extension 15 is provided on the rear end part 14a of the rear side frame 14 via the front plate 46 and the rear end panel 33.

A rear plate 47 is joined to a rear end part 15a of the extension 15, for example, by mig welding. A rear opening part of the extension 15 is closed by the rear plate 47. The rear plate 47 has a rear slope part 47a. The rear slope part 47a is formed in a slope shape toward a vehicle body frontward direction and outward in the vehicle width direction from a middle part 47b of the rear plate 47 along a left beam slope part 55 of the bumper beam 16.

In a state where the left beam slope part 55 is in contact with the rear slope part 47a, the left beam slope part 55 is attached to the rear slope part 47a by a bolt 51 and a nut 52. Similarly, in a state where a right beam slope part 56 of the bumper beam 16 is in contact with the rear slope part 47a of the right extension 15, the right beam slope part 56 is attached to the rear slope part 47a by a bolt 51 and a nut 52.

That is, the bumper beam 16 is attached to the extension 15 and the right extension 15 (refer to FIG. 3). That is, the bumper beam 16 is attached to a rear part of the vehicle body 10 and extends in the vehicle width direction.

As shown in FIG. 3 and FIG. 4, the bumper beam 16 is formed in a hollow shape having a rectangular frame in a cross-section by extrusion of an aluminum alloy material. The bumper beam 16 has a beam middle part 54, the left beam slope part 55, and the right beam slope part 56.

The beam middle part 54 extends linearly in the vehicle body front-to-rear direction. The left beam slope part 55 extends in a sloped manner in the vehicle width direction and in the vehicle body frontward direction from a left end part 54a of the beam middle part 54.

The right beam slope part 56 extends in a sloped manner in the vehicle width direction and in the vehicle body frontward direction from a right end part 54b of the beam middle part 54.

Figure 5:
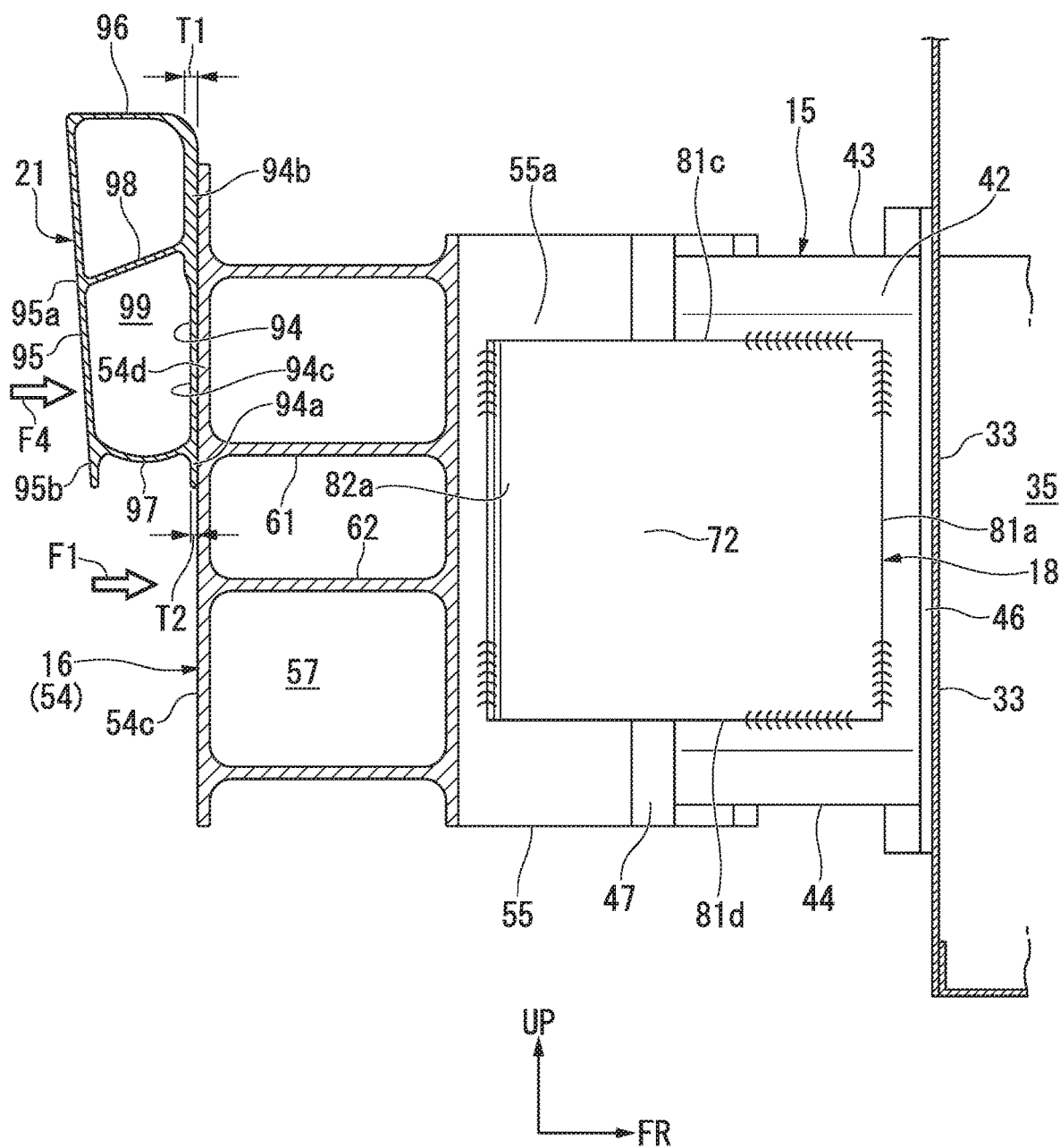
FIG. 5 is a cross-sectional view showing a state broken at a V-V line of the vehicle body front part structure of FIG. 3 in the embodiment of the present invention.

As shown in FIG. 5, the bumper beam 16 is formed in an external cross-section having a rectangular frame shape and has a hollow part 57. In the bumper beam 16, a first splitting part 61 and a second splitting part 62 are formed in the hollow part 57 to be spaced from each other in the vertical direction. The bumper beam 16 is reinforced by the first splitting part 61 and the second splitting part 62.

Figure 6:
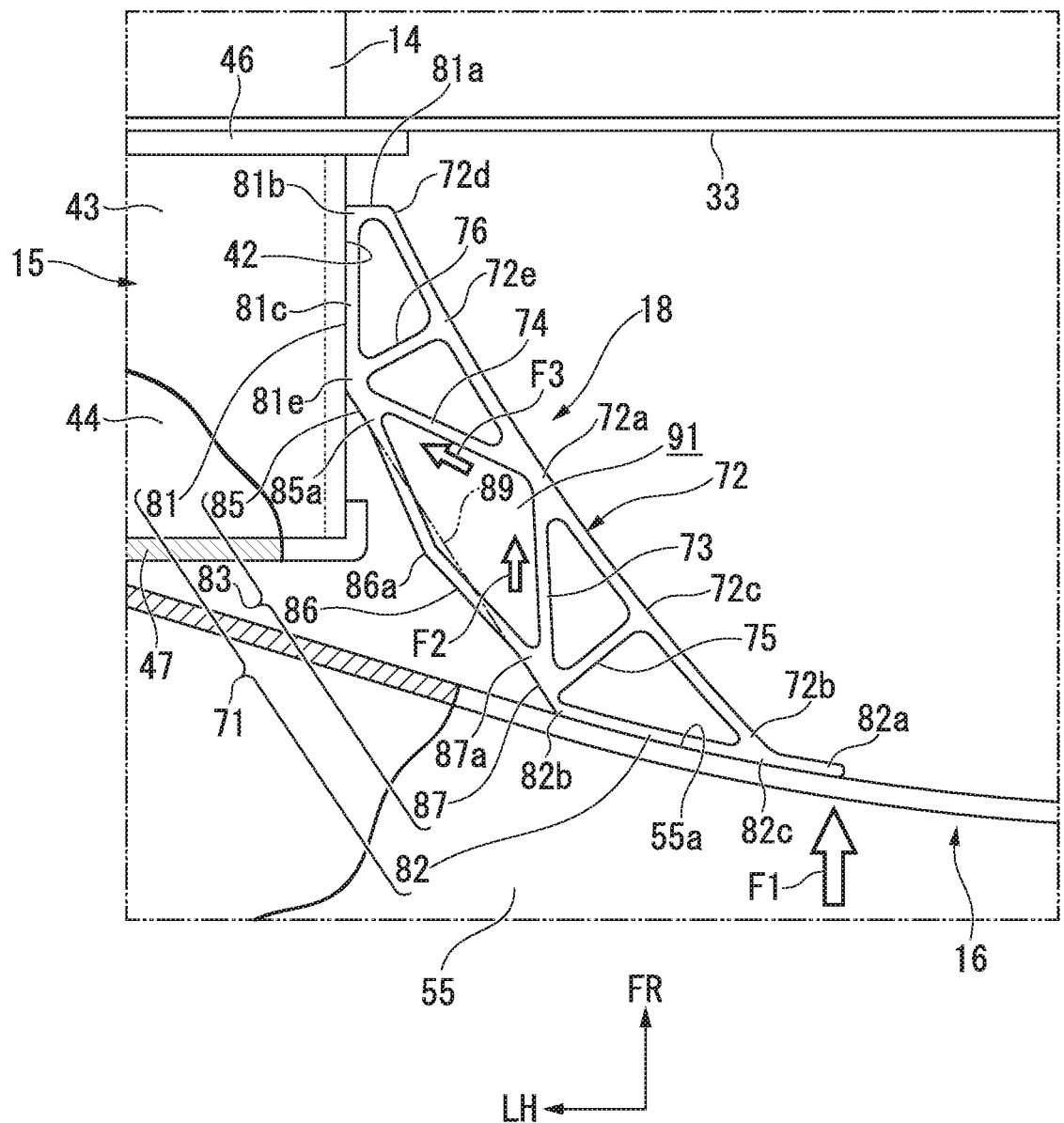
FIG. 6 is a plan view showing an enlarged state of a VI part of FIG. 4 in the embodiment of the present invention.

As shown in FIG. 5 and FIG. 6, the gusset 18 is provided between the bumper beam 16 (specifically, the left beam slope part 55) and the extension 15 and at an inner position in the vehicle width direction of the extension 15. The gusset 18 extends toward the vehicle body frontward direction and outward in the vehicle width direction toward the inner wall 42 of the extension 15 from a rear surface 55a of the left beam slope part 55.

The gusset 18 has a gusset outer wall (outer wall) 71, a gusset inner wall (inner wall) 72, a first rib 73, a second rib 74, a third rib 75, and a fourth rib 76. The gusset outer wall 71 has a gusset front wall 81, a gusset rear wall 82, and an outer wall bend part 83.

The gusset front wall 81 is in contact with the inner wall 42 of the extension 15 along the inner wall 42 of the extension 15 and has a protrusion part 81a at a front end part 81b of the gusset front wall 81. The protrusion part 81a protrudes inward (that is, a direction separated from the inner wall 42) in the vehicle width direction from the front end part 81b of the gusset front wall 81. The protrusion part 81a and the front end part 81b of the gusset front wall 81 are joined to the inner wall 42 by mig welding. An upper end part 81c of the gusset front wall 81 is joined to the inner wall 42 by mig welding. A lower end part 81d of the gusset front wall 81 is joined to the inner wall 42 by mig welding.

The gusset rear wall 82 is in contact with the rear surface 55a of the left beam slope part 55 of the bumper beam 16 along the rear surface 55a of the left beam slope part 55 of the bumper beam 16. An inner end part 82a of the gusset rear wall 82 is joined to the rear surface 55a of the left beam slope part 55 by mig welding.

The outer wall bend part 83 extends in a sloped manner inward in the vehicle width direction and toward the vehicle body rearward direction from a rear end part 81e of the gusset front wall 81 to a front end part 82b of the gusset rear wall 82. That is, the outer wall bend part 83 extends in the vehicle body front-to-rear direction and is arranged at a more outward position in the vehicle width direction than the gusset inner wall 72.

The outer wall bend part 83 has a front bend section 85, a protrusion bend section (bend part) 86, and a rear bend section 87. The front bend section 85 and the rear bend section 87 are arranged on a straight line 89 (shown by an imaginary line) that connects together a rear end 85a of the front bend section 85 and a front end 87a of the rear bend section 87. The protrusion bend section 86 is provided between the front bend section 85 and the rear bend section 87 and connects together the front bend section 85 and the rear bend section 87.

A middle portion 86a of the protrusion bend section 86 is arranged at a more outward position in the vehicle width direction than the straight line 89. The middle portion 86a protrudes outward in the vehicle width direction from the straight line 89, and thereby, the protrusion bend section 86 is bent in a V shape (ship bottom shape).

When an impact load is input due to rear collision, it is conceivable that an impact load F1 is input to the bumper beam 16. In this case, the impact load F1 is transmitted to the gusset 18 from the bumper beam 16.

The middle portion 86a of the protrusion bend section 86 of the gusset outer wall 71 is formed in a V shape so as to protrude outward in the vehicle width direction from the straight line 89. Accordingly, it is possible to favorably deform the protrusion bend section 86 (that is, the outer wall bend part 83) from the middle portion 86a toward the extension 15 on the outer side in the vehicle width direction by the impact load F1 that is input to the gusset 18. That is, the outer wall bend part 83 becomes a deformation facilitating part of the gusset 18. Hereinafter, the outer wall bend part 83 is described as a "deformation facilitating part 83".

In this way, the deformation facilitating part 83 is provided on the gusset outer wall 71. Further, the deformation facilitating part 83 is formed of the outer wall bend part 83 that is bent outward in the vehicle width direction toward the extension 15.

In this way, the gusset 18 is provided between the bumper beam 16 and the extension 15. Further, the deformation facilitating part 83 is provided on a middle (a middle part of the gusset outer wall 71) of the gusset 18. Accordingly, for example, when an impact load F1 is input to the bumper beam 16 due to rear collision, the input impact load F1 is transmitted from the bumper beam 16 to the gusset 18.

It is possible to deform the gusset 18 outward in the vehicle width direction from the deformation facilitating part 83 by the impact load F1 that is input to the gusset 18. In other words, it is possible to deform the gusset 18 toward the inner wall 42 side of the extension 15 and toward the rear surface 55a side of the left beam slope part 55 from the deformation facilitating part 83. That is, the impact load F1 is absorbed by the gusset 18, and it is possible to reduce the impact load F1 that is input to the extension 15 from the gusset 18.

The deformation facilitating part 83 (specifically, the middle part 86a) of the gusset 18 is arranged at a position that is relatively separated inward in the vehicle width direction from the inner wall 42 of the extension 15 and the rear surface 55a of the left beam slope part 55. It is possible to ensure the deformation amount of the deformation facilitating part 83. Thereby, it is possible to favorably deform the gusset 18 by the impact load F1 that is input to the bumper beam 16.

In this way, the outer wall bend part 83 is formed on the gusset outer wall 71 of the gusset 18, and the outer wall bend part 83 is the deformation facilitating part 83. Further, the deformation facilitating part 83 is bent toward the inner wall 42 of the extension 15 and the rear surface 55a of the left beam slope part 55 (outward in the vehicle width direction).

Accordingly, it is possible to deform the gusset 18 toward the inner wall 42 side of the extension 15 and the rear surface 55a side of the left beam slope part 55 by the outer wall bend part 83.

Thereby, it is possible to allow the joint between the inner wall 42 of the extension 15 and the gusset front wall 81 of the gusset 18 not to be easily peeled. Further, it is possible to allow the joint between the rear surface 55a of the left beam slope part 55 of the bumper beam 16 and the gusset rear wall 82 of the gusset 18 not to be easily peeled.

Further, when the deformation amount of the gusset 18 toward the inner wall 42 side of the extension 15 and the rear surface 55a side of the left beam slope part 55 is large, it is possible to allow the gusset 18 to come into contact with the inner wall 42 of the extension 15. That is, when a relatively large impact load F1 is input to the bumper beam 16, it is possible to allow the gusset 18 to be deformed and come into contact with the inner wall 42 of the extension 15.

Thereby, it is possible to efficiently transmit the impact load F1 to the extension 15 via the gusset 18.

The gusset inner wall 72 is arranged at a more inward position in the vehicle width direction than the gusset outer wall 71. The gusset inner wall 72 extends in a curved manner toward the vehicle body frontward direction and outward in the vehicle width direction from a region 82c close to the inner end part 82a of the gusset rear wall 82 to the protrusion part 81a of the gusset front wall 81. That is, the gusset inner wall 72 extends in the vehicle body front-to-rear direction.

The gusset inner wall 72 is formed to have a predetermined space with respect to the outer wall bend part 83. Accordingly, the gusset 18 is formed of the gusset outer wall 71 and the gusset inner wall 72 in a hollow shape that penetrates in the vertical direction. The gusset outer wall 71 and the gusset inner wall 72 form a hollow part 91 of the gusset 18.

A first rib 73, a second rib 74, a third rib 75, and a fourth rib 76 are provided at the hollow part 91 of the gusset 18. The first rib 73 and the second rib 74 extend so as to be sloped with respect to the outer wall bend part 83 and the gusset inner wall 72. The third rib 75 and the fourth rib 76 extend so as to be orthogonal with respect to the outer wall bend part 83 and the gusset inner wall 72.

The first rib 73 extends toward the vehicle body rearward direction from the rear bend section 87 of the outer wall bend part 83 to a middle part 72a of the gusset inner wall 72. That is, the first rib 73 extends toward the vehicle body rearward direction in a state of being connected to the rear bend section 87 and the middle part 72a of the gusset inner wall 72.

The second rib 74 extends diagonally outward in the vehicle width direction toward the inner wall 42 of the extension 15 from the middle part 72a (that is, a connection point between the first rib 73 and the gusset inner wall 72) of the gusset inner wall 72 to the front bend section 85 of the outer wall bend part 83.

An impact load F1 that is input to the bumper beam 16 is transmitted in a vehicle body front-to-rear direction to the gusset 18. Therefore, the first rib 73 is connected to the gusset outer wall 71 and the gusset inner wall 72, and the first rib 73 extends in the vehicle body front-to-rear direction. Accordingly, it is possible to allow the impact load F1 that is input to the bumper beam 16 to efficiently transmit to the first rib 73 (that is, the gusset 18).

Further, the second rib 74 is extended outward in the vehicle width direction toward the inner wall 42 of the extension 15 from the connection point (that is, the middle part 72a of the gusset inner wall 72) between the first rib 73 and the gusset inner wall 72. Accordingly, it is possible to efficiently transmit a load F2 that is transmitted to the first rib 73 via the second rib 74 to the extension 15 as a load F3.

That is, it is possible to support the load F2 by the first rib 73 and the second rib 74. Accordingly, it is possible to prevent the first rib 73 and the second rib 74 from being deformed by the load F2.

On the other hand, the middle portion 86a of the outer wall bend part 83 (specifically, the protrusion bend section 86) protrudes outward in the vehicle width direction from the straight line 89, and the protrusion bend section 86 is bent in a V shape. Accordingly, it is possible to allow stress to concentrate on the middle portion 86a by preventing deformation of the first rib 73 and the second rib 74 when an impact load F1 is input to the bumper beam 16. Thereby, it is possible to favorably bend the protrusion bend section 86 (that is, the gusset 18) toward the vehicle body outward direction from the middle portion 86a.

In this way, the load F2 is supported by the first rib 73 and the second rib 74. Thereby, it is possible to facilitate deformation of the gusset 18 toward the inner wall 42 side of the extension 15 and the rear surface 55a side of the left beam slope part 55 at the middle portion 86a (that is, a desired position of the gusset 18) of the protrusion bend section 86.

The third rib 75 extends diagonally inward in the vehicle width direction and toward the vehicle body frontward direction to the gusset inner wall 72 from the rear bend section 87 (that is, the connection point between the first rib 73 and the gusset outer wall 71) of the outer wall bend part 83. An inner end part of the third rib 75 is connected to a rear middle portion 72c between a rear end part 72b of the gusset inner wall 72 and the middle part 72a of the gusset inner wall 72.

The fourth rib 76 extends diagonally inward in the vehicle width direction and toward the vehicle body frontward direction to the gusset inner wall 72 from the rear end part 81e (that is, the connection point between the second rib 74 and the gusset outer wall 71) of the gusset front wall 81. An inner end part of the fourth rib 76 is connected to a front middle portion 72e between a front end part 72d of the gusset inner wall 72 and the middle part 72a of the gusset inner wall 72.

In this way, the third rib 75 is extended to the gusset inner wall 72 from the connection point (that is, the rear bend section 87) between the first rib 73 and the gusset outer wall 71. The third rib 75 is arranged on the left beam slope part 55 side of the bumper beam 16. Accordingly, the closed cross-section of the gusset 18 is split small by the third rib 75 in the vicinity of a connection between the rear surface 55a of the left beam slope part 55 and the gusset rear wall 82 of the gusset 18.

Thereby, the strength of the gusset 18 is enhanced in the vicinity of the connection between the rear surface 55a of the left beam slope part 55 and the gusset rear wall 82.

Further, the fourth rib 76 is extended to the gusset inner wall 72 from the connection point (that is, the rear end part 81e of the gusset front wall 81) between the second rib 74 and the gusset outer wall 71. The fourth rib 76 is arranged on the extension 15 side. Accordingly, the cross-section of the gusset 18 is split small by the fourth rib 76 in the vicinity of a connection between the inner wall 42 of the extension 15 and the gusset front wall 81 of the gusset 18.

Thereby, the strength of the gusset 18 is enhanced in the vicinity of the connection between the inner wall 42 of the extension 15 and the gusset front wall 81.

In this way, the strength of the gusset 18 is enhanced in the vicinity of the connection between the rear surface 55a of the left beam slope part 55 and the gusset rear wall 82. Further, the strength of the gusset 18 is enhanced in the vicinity of the connection between the inner wall 42 of the extension 15 and the gusset front wall 81.

Thereby, it is possible to solidly join the gusset 18 to the rear surface 55a of the left beam slope part 55 and the inner wall 42 of the extension 15.

With reference to FIG. 3 and FIG. 5, the sub beam 21 is provided on a rear surface (outer surface) 54c of the beam middle part 54 in the middle area in the vehicle width direction of the beam middle part 54. The sub beam 21 is provided on an upper half part 54d of the rear surface 54c of the beam middle part 54 and extends in the vehicle width direction along the upper half part 54d of the rear surface 54c.

The sub beam 21 has a beam front wall 94, a beam rear wall 95, a beam upper wall 96, a beam lower wall (second splitting wall) 97, and a beam splitting wall (first splitting wall) 98. The sub beam 21 is formed of the beam front wall 94, the beam rear wall 95, the beam upper wall 96, and the beam lower wall in a hollow shape having rectangular cross-section.

The beam splitting wall 98 is provided at an inner part 99 of the sub beam 21. The beam splitting wall 98 extends to be an upslope to the beam front wall 94 from a region 95a of the middle part in the vertical direction of the beam rear wall 95. That is, the beam splitting wall 98 extends diagonally in the vehicle body front-to-rear direction at the inner part 99 of the sub beam 21.

When an impact load F1 is input to the bumper beam 16, the bumper beam 16 collapses and absorbs the impact load F1. Therefore, when the sub beam 21 is provided on a rear surface (specifically, the rear surface 54c of the beam middle part 54) of the bumper beam 16, the bumper beam 16 collapses, and the sub beam 21 does not easily collapse.

Therefore, the beam splitting wall 98 at the inner part 99 of the sub beam 21 extends diagonally in the vehicle body front-to-rear direction. Accordingly, it is possible to favorably deform the beam splitting wall 98 by a load F4 that is input to the sub beam 21. Thereby, it is possible to allow the sub beam 21 to favorably collapse by the load F4 that is input to the sub beam 21. That is, for example, when the load F4 is small, it is possible to favorably absorb the load F4 by the sub beam 21.

The beam lower wall 97 is connected to a lower end part 94a of the beam front wall 94 and a lower end part 95b of the beam rear wall 95. The beam lower wall 97 is provided below the beam splitting wall 98 to be spaced with respect to the beam splitting wall 98. The beam lower wall 97 is bent in a curved shape so as to protrude downward.

In this way, the beam lower wall 97 has a shape that is bent in the downward direction. Accordingly, it is possible to favorably deform the beam lower wall 97 by the load F4 that is input to the sub beam 21. Thereby, it is possible to allow the sub beam 21 to favorably collapse by the load F4 that is input to the sub beam 21. That is, for example, when the load F4 is small, it is possible to favorably absorb the load F4 by the sub beam 21.

The beam lower wall 97 is provided at a position that is opposed in the vehicle body front-to-rear direction to the first splitting part 61 of the bumper beam 16. That is, the beam lower wall 97 is arranged on substantially the same straight line that extends in the vehicle body front-to-rear direction with respect to the first splitting part 61. Thereby, it is possible to efficiently transmit the load F4 from the sub beam 21 (specifically, the beam lower wall 97) via the beam lower wall 97 to the bumper beam 16.

That is, for example, when the load F4 is small, it is possible to support the load F4 by the beam lower wall 97, and it is possible to allow the beam lower wall 97 (that is, the sub beam 21) to favorably collapse. Thereby, it is possible to favorably absorb the load F4 by the sub beam 21.

Further, among the beam front wall 94 of the sub beam 21, a thickness size T1 of an upper half part 94b is set to be larger than a thickness size T2 of a lower half part 94c. Thereby, it is possible to allow the rest of the load after the load F4 is absorbed by the sub beam 21 to efficiently transmit to the bumper beam 16 via a thick portion of the upper half part 94b.

Figure 7:
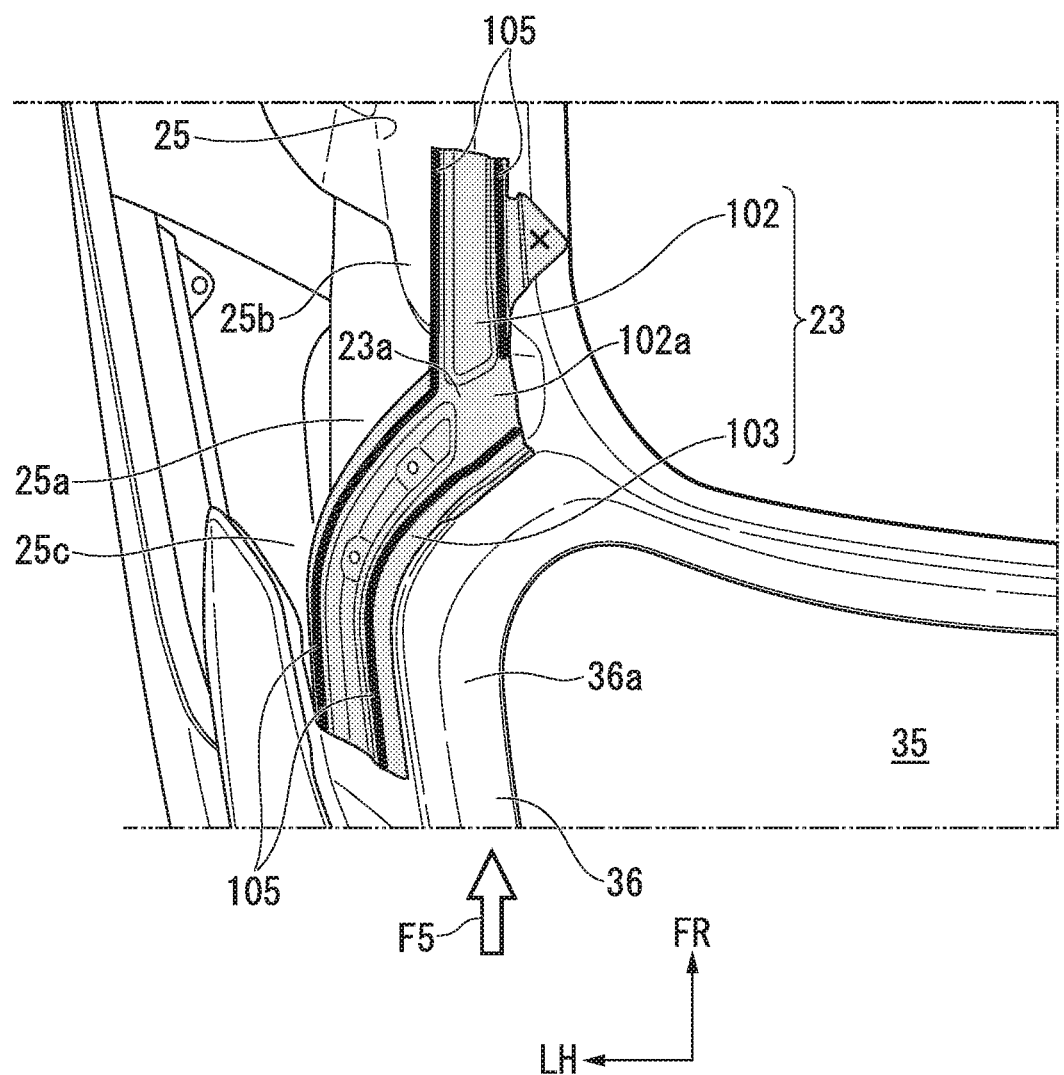
FIG. 7 is a plan view showing a state seen from a VII arrow direction of FIG. 2 in the embodiment of the present invention.

As shown in FIG. 2 and FIG. 7, the stiffener 23 is provided along the trunk opening part 36 among the rear part 25a of the rear pillar 25. The stiffener 23 has a stiffener linear part 102 and a stiffener curved part 103. The stiffener linear part 102 is joined, for example, by spot welding, to and along a linear portion 25b of the rear part 25a of the rear pillar 25. The stiffener linear part 102 extends along a left side edge 34a of the rear window glass 34.

The stiffener curved part 103 extends in a curved shape toward the vehicle body rearward direction from a rear end part 102a of the stiffener linear part 102. The stiffener curved part 103 is joined, for example, by spot welding, to and along a curved portion 25c of the rear part 25a of the rear pillar 25. Accordingly, the stiffener 23 is provided along the left edge 36a among a circumferential edge of the trunk opening part 36.

The stiffener 23 is arranged along an upper part 26a of the rear fender 26. A sealer (bond) 105 is applied on a front surface 23a of the stiffener 23. The front surface 23a of the stiffener 23 is bonded (refer to FIG. 1) to the upper part 26a of the rear fender 26 by a sealer 105. That is, it is not necessary to join the stiffener 23 to the upper part 26a of the rear fender 26 by welding. Thereby, it is possible to allow no traces of welding to remain on the rear fender 26, and it is possible to ensure a design property of the rear fender 26.

The stiffener 23 is joined, for example, by spot welding, along the shape around the trunk opening part 36. Further, the front surface 23a of the stiffener 23 is bonded to the upper part 26a of the rear fender 26 by the sealer 105. Accordingly, the upper part 26a of the rear fender 26 is reinforced by the stiffener 23. Thereby, for example, it is possible to prevent deformation of the rear fender 26 due to rear collision by the stiffener 23.

Next, an example in which deformation of the rear fender 26 is prevented by the stiffener 23 of the vehicle body rear part structure 12 is described with reference to FIG. 8.

Figure 8:
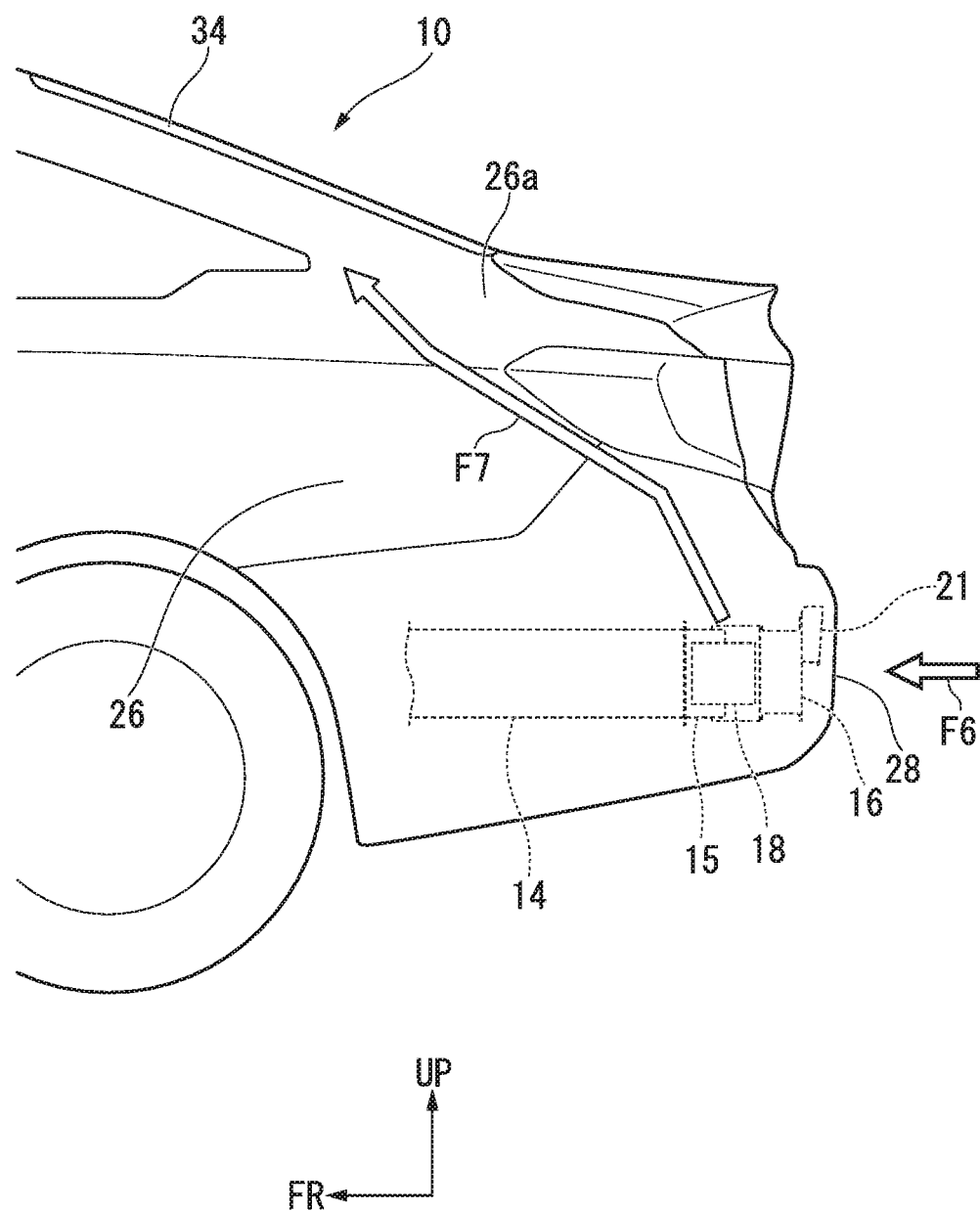
FIG. 8 is a side view showing an example in which the deformation of a rear fender is prevented by a stiffener of the vehicle body front part structure in the embodiment of the present invention.

As shown in FIG. 8, an impact load F6 is input to the bumper beam 16 due to rear collision. A load F7 is transmitted to the left edge 36a (refer to FIG. 2) of the trunk opening part 36 from the bumper beam 16.

The stiffener 23 is provided along the left edge 36a of the trunk opening part 36.

Accordingly, it is possible to support the load F7 by the stiffener 23 and prevent deformation of the left edge 36a.

Thereby, it is possible to prevent the rear fender 26 (specifically, the upper part 26a of the rear fender 26) from being deformed by the load F7. The rear fender 26 is an exterior component of the vehicle body 10. That is, by preventing deformation of the rear fender 26, it is possible to ensure the appearance property of the vehicle body 10.

The technical scope of the present invention is not limited to the embodiment described above, and a variety of changes can be added without departing from the scope of the invention.

For example, the above embodiment is described using an example in which the present invention is applied to, for example, the vehicle body rear part structure 12 that constitutes the rear part of the vehicle body 10 as a vehicle body structure; however, the embodiment is not limited thereto. For example, it is possible to apply the present invention to a vehicle body front part structure that constitutes the front part of the vehicle body 10 as another vehicle body structure.

Further, the above embodiment is described using an example in which the middle portion 86a of the outer wall bend part 83 protrudes outward in the vehicle width direction, the outer wall bend part 83 is bent in a V shape (ship bottom shape), and the outer wall bend part 83 is allowed to be a "deformation facilitating part 83"; however, the embodiment is not limited thereto. As another example, for example, by forming a cutout on the outer wall bend part 83, adjusting the plate thickness size of the outer wall bend part 83, or considering the material property of the outer wall bend part 83, it is also possible to allow the outer wall bend part 83 to be the "deformation facilitating part 83".

Further, the above embodiment is described using an example in which the sub beam 21 is attached to the rear surface 54c of the beam middle part 54 (that is, the bumper beam 16) as an outer surface of the bumper beam 16; however, the embodiment is not limited thereto. It is also possible to attach the sub beam 21 to a front surface of the bumper beam 16 as another outer surface of the bumper beam 16.

Further, it is also possible to attach the sub beam 21 to both of the rear surface of the bumper beam 16 and the front surface of the bumper beam 16, as an outer surface of the bumper beam 16.

Further, the above embodiment is described using an example in which the beam splitting wall 98 of the sub beam 21 extends to be an upslope toward the beam front wall 94 from the beam rear wall 95; however, the embodiment is not limited thereto. As another example, it is also possible to allow the beam splitting wall 98 to extend to be a downslope (that is, opposite to the slope direction of the embodiment) toward the beam front wall 94 from the beam rear wall 95.

Further, the above embodiment is described using an example in which the beam lower wall 97 is bent in a curved shape so as to protrude downward; however, the embodiment is not limited thereto. As another example, it is also possible to bend the beam lower wall 97 in a curved shape so as to protrude upward.

What is claimed is:

1. A vehicle body structure comprising:
a bumper beam that extends in a vehicle width direction in at least one of front and rear parts of a vehicle body;
an extension for attaching the bumper beam to the vehicle body; and
a gusset that is provided between the bumper beam and the extension and at an inner position in a vehicle width direction of the extension,
wherein a deformation facilitating part is provided on a middle part of the gusset,
the gusset has an outer wall on an outer side in a vehicle width direction and an inner wall on an inner side in the vehicle width direction that extend in a vehicle body front-to-rear direction, and
the deformation facilitating part is provided on the outer wall and has a bend part that is formed in a V shape so as to protrude outward in the vehicle width direction and that is bent toward the extension.

2. A vehicle body structure comprising:
a bumper beam that extends in a vehicle width direction in at least one of front and rear parts of a vehicle body;
an extension for attaching the bumper beam to the vehicle body; and
a gusset that is provided between the bumper beam and the extension and at an inner position in a vehicle width direction of the extension,
wherein a deformation facilitating part is provided on a middle part of the gusset,
the gusset has:
an outer wall on an outer side in a vehicle width direction and an inner wall on an inner side in the vehicle width direction that extend in a vehicle body front-to-rear direction;
a first rib that is connected to the outer wall and the inner wall and that extends in a vehicle body front-to-rear direction, and
a second rib that extends toward the extension diagonally outward in a vehicle width direction from a connection point between the first rib and the inner wall, and
the deformation facilitating part is provided on the outer wall and has a bend part that is formed in a V shape so as to protrude outward in the vehicle width direction and that is bent toward the extension.

3. The vehicle body structure according to claim 2, wherein the gusset has a third rib that extends diagonally inward in a vehicle width direction to the inner wall from a connection point between the first rib and the outer wall and a fourth rib that extends diagonally inward in a vehicle width direction to the inner wall from a connection point between the second rib and the outer wall.

4. The vehicle body structure according to claim 1, comprising a sub beam that is provided on an outer surface of the bumper beam and that extends in a vehicle width direction, wherein the sub beam has a first splitting wall that extends diagonally toward a vehicle body front-to-rear direction at an inner part of the sub beam.

5. The vehicle body structure according to claim 4, wherein the sub beam has a second splitting wall having a shape that is bent in a vertical direction below the first splitting wall.

6. The vehicle body structure according to claim 1, wherein the bumper beam is provided on a rear part of the vehicle body, and a stiffener that is fixed to both a rear pillar and a rear fender is provided along a trunk opening part at a more vehicle body frontward position than the bumper beam.

* * * * *